Figure 1:
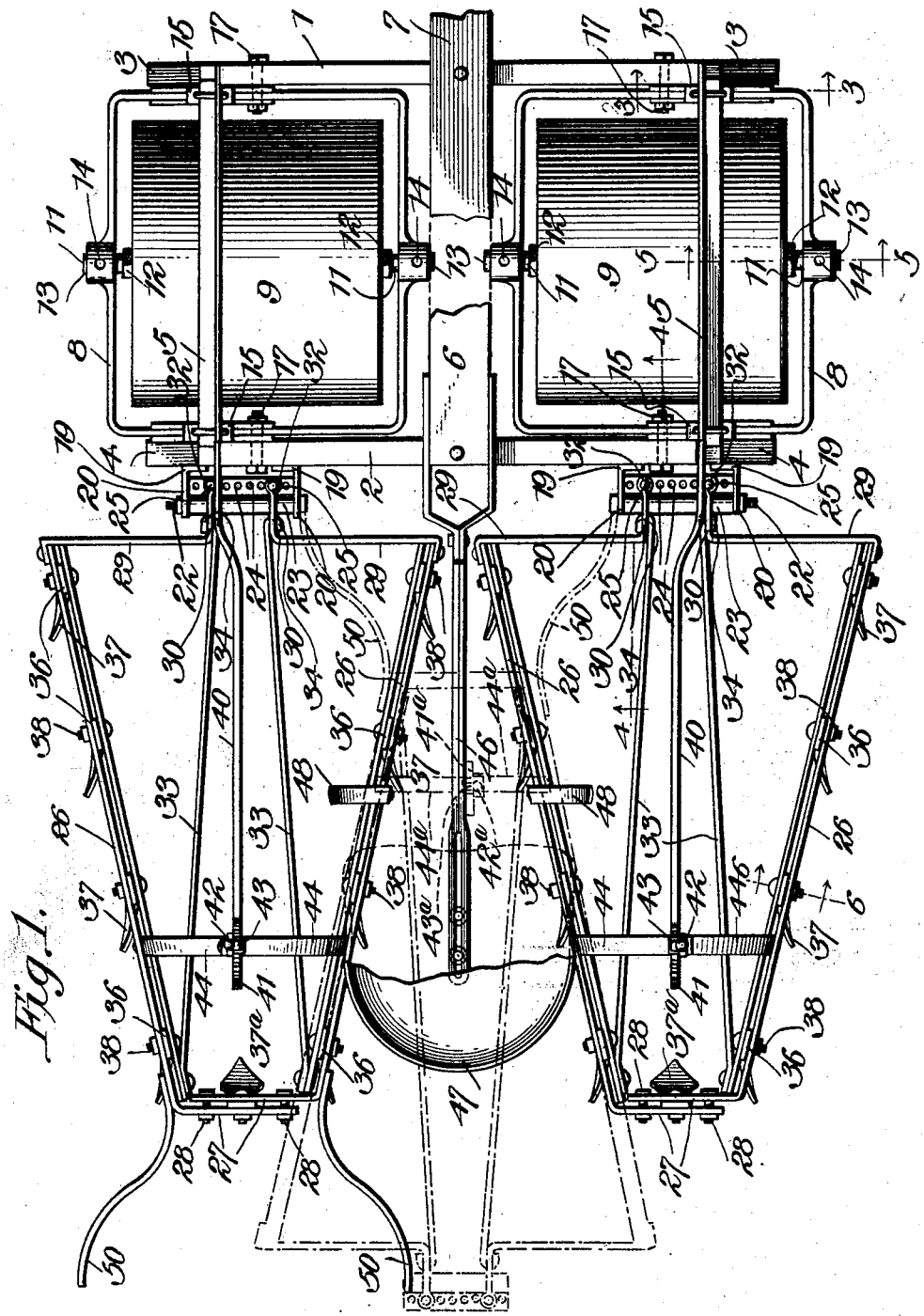

No. 746,066. PATENTED DEC. 8, 1903.
O. A. GALLATIN.
COMBINED ROLLER, HARROW, AND CULTIVATOR.
APPLICATION FILED AUG. 24, 1903.
NO MODEL. 2 SHEETS—SHEET 1.

Witnesses
O. A. Gallatin, Inventor,
by C. A. Snow & Co.
Attorneys

No. 746,066. PATENTED DEC. 8, 1903.
O. A. GALLATIN.
COMBINED ROLLER, HARROW, AND CULTIVATOR.
APPLICATION FILED AUG. 24, 1903.
NO MODEL. 2 SHEETS—SHEET 2.
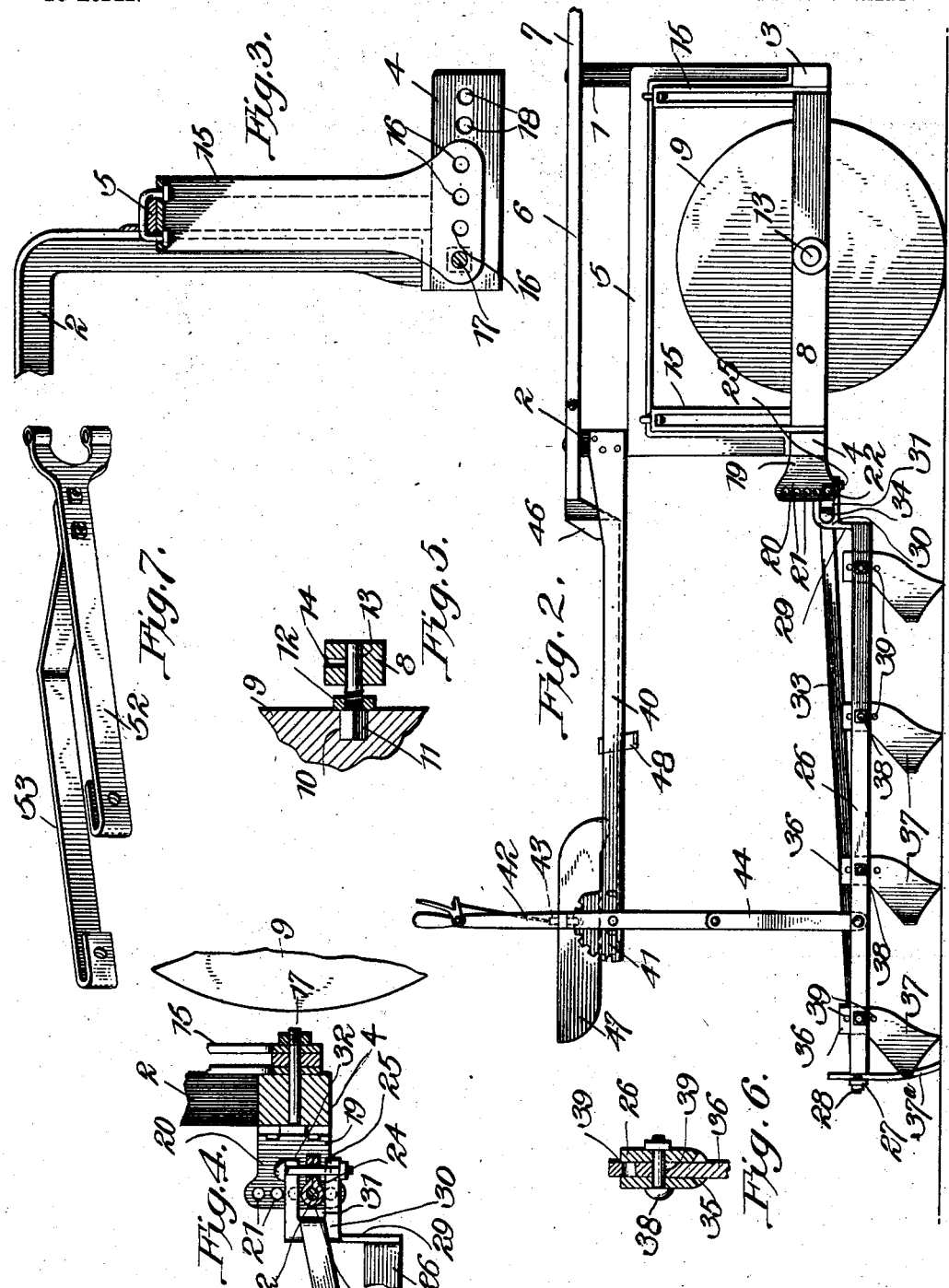

No. 746,066. Patented December 8, 1903.

UNITED STATES PATENT OFFICE.

OLIVER A. GALLATIN, OF WAHOO, NEBRASKA.

COMBINED ROLLER, HARROW, AND CULTIVATOR.

SPECIFICATION forming part of Letters Patent No. 746,066, dated December 8, 1903.

Application filed August 24, 1903. Serial No. 170,640. (No model.)

*To all whom it may concern:*

Be it known that I, OLIVER A. GALLATIN, a citizen of the United States, residing at Wahoo, in the county of Saunders and State of Nebraska, have invented a new and useful Combined Roller, Harrow, and Cultivator, of which the following is a specification.

This invention relates to an improved agricultural implement in which shall be combined a roller and a harrow, the former being arranged in advance of the latter for the purpose of crushing the clods and preparing the soil for the effective operation of the harrow or cultivating implement following behind said roller.

My invention has for its object the production of an implement of this class which shall be capable of a number of various adjustments, so as to adapt it to be used for different purposes, by simply arranging or transposing the constituent parts of the device in the proper manner.

Another object is to make the parts relatively adjustable, so that while in operation they may be easily manipulated in any manner that may be thought desirable and necessary.

Another object of the invention is to provide a device of this class which shall possess superior advantages in point of simplicity, durability, and general efficiency.

With these and other ends in view my invention consists in the improved construction, arrangement, and combination of parts, which will be hereinafter fully described and particularly pointed out in the claims.

In the accompanying drawings I have shown a simple and preferred form of embodiment of my invention, with the understanding, however, that changes may be made as to the shape, size, proportions, or exact manner of assemblage without departing from the scope of the invention.

In said drawings, Figure 1 is a plan view of a machine constructed in accordance with the principles of my invention. Fig. 2 is a side elevation. Fig. 3 is a detail sectional view showing a portion of the main frame, together with one of the shields 15, taken on the line 3 3 in Fig. 1. Fig. 4 is a sectional detail view on an enlarged scale, taken on the line 4 4 in Fig. 1. Fig. 5 is a sectional detail view taken on the line 5 5 in Fig. 1. Fig. 6 is a sectional detail view taken on the line 6 6 in Fig. 1. Fig. 7 is a perspective detail view illustrating a modification.

Corresponding parts in the several figures are indicated by similar numerals of reference.

The main or carrying frame of my improved implement is composed of two arched beams 1 and 2, the former being the front one. The legs of said arches are provided at their lower ends with lateral outward extensions or brackets 3 3 and 4 4, and the legs of the front arch are connected with the legs of the rear arch by means of braces 5, which are likewise arched, the lower ends of the legs of said arches 5 being supported upon the upper sides of the brackets 3 4. A beam 6, a forward extension of which constitutes a tongue 7, is supported centrally upon the upper sides of the arches 1 and 2.

The members thus far enumerated constitute the main or carrying frame of my improved implement.

8 8 designate a pair of approximately rectangular frames which constitute the roller-carrying frames of the device. The rollers, which are designated 9, may be of any desired construction and of any desired material. I desire it to be particularly understood that these rollers are intended to be adapted not only for land-rolling purposes, but that they also serve as wheels or rotary supporting elements for the device. Said rollers may be either hollow or solid, and they may within the scope of my invention be composed of cylindrical drums connected by means of spokes with hubs upon the respective supporting-shafts. In the embodiment of my invention here shown these rollers have been constructed of wood, and they are provided with longitudinal openings 10, square in cross-section, through which extend the shafts 11, the projecting ends of which are reduced and partially screw-threaded for the reception of nuts 12, whereby the said rollers are retained in position on said shafts. The projecting cylindrical ends 13 of the latter have bearings in the ends of the frame 8, which are provided with vertical openings 14, leading to said recesses for lubricating purposes.

Suitably attached to the inner sides of the brackets 3 and 4 are yokes 15, formed of sheet metal, the upper ends of said yokes being also suitably attached to the under sides of the brace-bars 5. These yokes, as well as the brackets 3 4 in contact with which they are mounted, are provided with pluralities of bolt-holes 16 for the passage of the bolts 17 by means of which the roller-carrying frames 8 are pivotally connected with the main frame of the machine. The said roller-carrying frames may thus be pivotally connected with the main frame, either centrally, or the said roller-carrying frames may be set out apart from each other, or they may be moved in an inward direction toward each other, as may be desired and according to the work that is performed. It is obvious that when a central adjustment exists the rollers will be practically evenly balanced. When they are set in either direction of the center, the tendency will be for the rollers to assume a slanting position in either an inward or an outward direction, thus adapting said rollers to work either upon opposite sides of a ridge or upon the adjacent sides of two ridges. The scope of adjustment will be limited only by the number of bolt-holes 16 in the brackets 3 and 4 and the yokes 15. Auxiliary bolt-holes 18 may be formed in the front and rear sides of the roller-carrying frames for the passage of the pivotal bolts 17.

Upon the rear sides of the brackets 4 are suitably secured vertically-disposed angular or L-shaped plates 19, the rearward-extending members of which form lugs or ears 20, which are to be suitably spaced apart and each of which is provided with a plurality of perforations 21 for the reception of a transverse bolt 22, which is vertically adjustable in said perforations, said bolt being provided with a nut whereby it is retained in adjusted position. Clevis-plates 23 are mounted upon the bolts 22, said plates being bent to a U shape, so as to embrace said bolts, and said plates being furthermore provided with perforations 24 for the reception of bolts 25 upon which the earth-engaging or cultivating elements of the device are to be mounted. The latter elements are composed of rearwardly-converging side frame-bars 26, the rear ends of which overlap one another, as shown at 27, each of the overlapping ends being provided with a plurality of openings for the reception of connecting-bolts 28, which admit of the lateral adjustment with relation to each other of the rear ends of said side frame-pieces. The forward ends of the latter are bent inwardly in the direction of each other, as shown at 29, said inturned ends or upper ends being curved somewhat in an upward direction and provided at their inner ends with lugs or flanges 30, which are bifurcated, as at 31, so as to straddle the clevis-plates 23, and said bifurcated ends being bent upon themselves to form eyes or bearings 32 for the reception of the pins or bolts 25, whereby they are adjustably connected with the clevis-plates. Now it will be seen that the overlapping rear ends of the said frame-bars 26 are adjustably connected with each other, while the front ends of said side frame-bars are adjustably connected with the clevis-plates. Hence it is obvious that said side frame-bars may be spaced apart any suitable distance for the work in hand.

I prefer to attach to the frame-bars 26, near their front ends, a pair of braces 33, the upper ends of which are connected with the bifurcated flanges 30, for instance, by forming upon the front ends of said braces hooks 34, that will engage between the legs of said bifurcations. The manner of attachment is immaterial, as any suitable method of attachment will enable these braces to perform the function assigned to them—namely, to stiffen the triangular frames, which may be designated the "harrow-frames." The side bars 26 of said frames may be of any desired construction, but in the accompanying drawings I have shown them as being formed of double or U-shaped metallic plates, the lower sides of which are provided with slots 35 for the admission of the shanks 36 of the cultivating implements, which latter are designated 37. With regard to these cultivating implements I desire to state particularly that they may be of any desired construction. Under some circumstances they will be ordinary cutters which, if desired, may have a slant which shall operate to throw the dirt to either side, or the said cultivating implements may be shovel-plows, turning-plows, or, in fact, they may be earth-engaging implements of any character whatsoever and still be within the scope of my invention. These plows, cutters, or other implements may be disposed one in each of the slots 35 or in alternate slots only, or they may be arranged in any desired relation to each other, or differently constructed implements may be used at the same time, the change involving no departure from my invention, but simply the substitution of one set of well-known implements for another. One such implement may also be disposed between the overlapping rear ends of the side frame-bars, as will be seen in Fig. 2 of the drawings at 37$^a$. The shanks of the several earth-engaging elements may be secured by means of bolts, set-screws, clips, or other suitable fastening devices which shall admit of the vertical adjustment of the same. In the drawings bolts 38 have been shown, and the shanks of the tools have been provided with pluralities of perforations 39 for the reception of said bolts.

It will be observed that by constructing the side bars of the harrow-frames in the manner described of doubled plates with slots in their under sides the shanks engaging said slots will be held with absolute security against displacement under the strain involved in the practical use of the device.

The rear arch-bar 2 on the main frame of the machine is provided with rearwardly-extending brackets 40, the rear ends of which terminate in rack-segments 41. Hand-levers 42 are pivotally connected with the brackets 40 concentrically with the rack-segments 41, and said levers 42 are provided with spring-actuated dogs 43, of ordinary construction, engaging said rack-segments. The upper ends of the levers 42 have handles, and their lower ends are pivotally connected with links 44, the lower ends of which have pivotal connection with the side bars 26 of the respective frames, which by means of the said levers may be tilted and partially raised from the ground, as desired.

Pivotally connected with the longitudinal top beam 6 in front of the arch-bar 2 is a bifurcated seat-bar 46, which normally extends in a rearward direction, it being supported by the upper side of the arch-bar 2. Said seat-bar is provided with a plurality of perforations for the adjustable connection therewith of the seat 47, which is thus capable of being longitudinally adjusted. Foot-rests, as 48, may be suitably mounted upon the inner frame-bars 26 of the harrow-frames, or the driver may place his feet directly upon said side bars for the purpose of assisting by the pressure of his feet in forcing the earth-engaging tools carried by said frame into the ground to the desired depth. It is obvious that this adjustment is primarily effected by means of the hand-levers 42; but the pressure of the driver's feet will be effective in forcing the earth-engaging tools into the ground.

In Fig. 1 I have shown in dotted lines a modified arrangement of the parts of my invention. In this figure one of the harrow-frames has been entirely removed from the machine and the other frame is reversed, so that its narrow or pointed end shall be at the front. The clevis-plate 23 is removed or disconnected from the perforated plates 20 and is now utilized simply for spacing the brackets 29 at the ends of the side bars 26. What is now the front end of the harrow-frame—namely, its pointed end—where the side beams are overlapped, is connected by means of braces 50 with the perforated plates 20, connected with the brackets upon the legs at the opposite ends of the rear arch-bar 2, so that the harrow-frame shall follow between the pivoted frames carrying the rollers or rotary supporting means. This arrangement has been illustrated in Fig. 1 of the drawings.

A modified construction of a frame carrying earth-engaging tools may be seen in Fig. 7. In this case the frame is composed of parallel bars 52 53, suitably connected at their front ends with the clevis-plates and carrying at their rear ends suitable plows or shovels adapted to cultivate the ground for the purpose of laying corn by. Numerous other changes and modifications entirely within the scope of my invention will be readily suggested to those skilled in the art to which my invention appertains.

For the purpose of enabling the operation of my invention to be more clearly understood I will describe the operation for working listed corn two rows at a time. The rollers or rotary elements 9 are so disposed as to run on top of the ridges. Then the harrow-frames are set in the proper positions and the two first cutters or earth-engaging tools of each frame are set lower than the rest, and the several cutters or cultivating implements will be usually set so as to throw dirt inward in order to form a ridge the top of which may be stirred or furrowed by means of the narrow shovel, which is usually mounted between the overlapping rear ends of the side bars of the frame. All the cultivating implements are capable of being reversed, so as to throw dirt to or from the ridge. The harrow-frames may be manipulated independently of each other by means of the levers connected near their rear ends and by the pressure of the feet of the driver.

When a single harrow-frame is used, the same being reversed, as shown in Fig. 1, the adjusting-lever is shifted from the bracket 40 to the seat-bar 46. In this case the adjusting-lever is designated 42$^a$. The rack-segment, which must be separately secured to the seat-bar, is designated 41$^a$. The spring-actuated dog, which connects the lever with the segment, is designated 43$^a$, and the pivoted connecting links 44$^a$. The operation of these parts will be readily understood.

Other methods of transposing and arranging the elements of my invention besides those herein specifically described will be readily understood and will of course be resorted to according to the purposes for which the device is to be employed.

I desire to have it specially understood that while rollers 9 have in the drawings hereto annexed been shown in connection with the invention such rollers in reality are rotary supporting elements which while they act to pulverize the soil in the manner of land-rollers are also and specially designed to support the machine in operative position.

Having thus described my invention, I claim—

1. In a device of the class described, a frame comprising front and rear arch-bars, the lower ends of the legs of which have laterally-extending brackets, and arched braces connecting said front and rear arch-bars and supported upon the brackets extending from the latter.

2. In a device of the class described, a frame comprising front and rear arch-bars, brackets extending laterally from the lower ends of the legs of said arch-bars, arched braces connecting the said front and rear arch-bars and supported at their lower ends upon the laterally-extending brackets, and a longitudinal beam supported upon the front and rear arch-bars and extended forwardly to form a tongue.

3. In a device of the class described, a frame comprising front and rear arch-bars, brackets extending laterally from the lower ends of the legs of the same and arched braces connecting the front and rear arch-bars, in combination with frames pivotally mounted between said front and rear arch-bars, and rotary supporting means mounted in said frames.

4. In a device of the class described, a frame comprising front and rear arch-bars having laterally-extending brackets, arch-connecting braces, and yokes connected securely with the inner sides of the laterally-extending brackets and with the under sides of the connecting-braces, in combination with frames mounted pivotally and adjustably in said yokes, pivotal connecting means extending from said yokes, through the pivoted frames and through the brackets of the main frame, and rotary supporting means mounted in said pivoted frames.

5. In a device of the class described, a main frame, auxiliary frames pivotally connected therewith, and rotary supporting means in said pivoted frames, in combination with harrow-frames connected pivotally and adjustably with said main frame, brackets extending rearwardly from the latter and having rack-segments at their rear ends, levers pivotally connected with said brackets, spring-actuated dogs connected with said levers and engaging the rack-segments, and links connecting the lower ends of said levers pivotally with the side bars of the harrow-frames.

6. In a device of the class described, a frame comprising front and rear arches suitably connected and a longitudinal bar supported upon said arches, in combination with a seat-bar connected pivotally with said longitudinal beam in front of the rear bar and normally resting upon said arch.

In testimony that I claim the foregoing as my own I have hereto affixed my signature in the presence of two witnesses.

OLIVER A. GALLATIN.

Witnesses:
   J. J. JOHNSON,
   J. F. BASTAR.